US008414981B2

(12) United States Patent
Iezzi et al.

(10) Patent No.: US 8,414,981 B2
(45) Date of Patent: Apr. 9, 2013

(54) MULTILAYER COATINGS SUITABLE FOR AEROSPACE APPLICATIONS

(75) Inventors: Erick B. Iezzi, Pittsburgh, PA (US); Mark P. Bowman, New Kensington, PA (US); David N. Walters, Slippery Rock, PA (US)

(73) Assignee: PRC DeSoto International, Inc., Sylmar, CA (US)

( * ) Notice: Subject to any disclaimer, the term of this patent is extended or adjusted under 35 U.S.C. 154(b) by 1070 days.

(21) Appl. No.: 11/840,288

(22) Filed: Aug. 17, 2007

(65) Prior Publication Data

US 2009/0286002 A1    Nov. 19, 2009

(51) Int. Cl.
*C08F 2/48* (2006.01)

(52) U.S. Cl.
USPC .......................... 427/508; 427/384; 427/385.5

(58) Field of Classification Search .................. 427/508, 427/384, 385.5
See application file for complete search history.

(56) References Cited

U.S. PATENT DOCUMENTS

| 3,355,512 | A |   | 11/1967 | De Acetis |  |
|---|---|---|---|---|---|
| 3,748,190 | A | * | 7/1973 | Weber et al. ................ | 428/336 |
| 3,877,971 | A |   | 4/1975 | Guthrie et al. |  |
| 3,898,349 | A | * | 8/1975 | Kehr et al. ................ | 427/500 |
| 3,976,553 | A |   | 8/1976 | Larsen |  |
| 4,008,341 | A |   | 2/1977 | Kehr |  |
| 4,139,385 | A |   | 2/1979 | Crivello |  |
| 4,233,205 | A | * | 11/1980 | O'Connor et al. ........... | 524/871 |
| 4,234,676 | A |   | 11/1980 | Hein |  |
| 4,682,612 | A | * | 7/1987 | Giuliano ................ | 132/73 |
| 4,808,638 | A |   | 2/1989 | Steinkraus |  |
| 5,095,069 | A |   | 3/1992 | Ambrose |  |
| 5,876,805 | A |   | 3/1999 | Ostlie |  |
| 6,077,885 | A |   | 6/2000 | Hager et al. |  |
| 6,172,179 | B1 |  | 1/2001 | Zook |  |
| 6,509,418 | B1 |  | 1/2003 | Zook |  |
| 6,639,046 | B1 |  | 10/2003 | Van Dijk |  |
| 2008/0058439 | A1 | * | 3/2008 | Walters ................ | 522/96 |
| 2009/0047442 | A1 |  | 2/2009 | Bowman |  |
| 2009/0047443 | A1 |  | 2/2009 | Bowman et al. |  |
| 2009/0047531 | A1 |  | 2/2009 | Bartley et al. |  |
| 2009/0047546 | A1 |  | 2/2009 | Bowman et al. |  |

FOREIGN PATENT DOCUMENTS

| JP | 60249111 | 12/1985 |
| WO | 00/64959 | 11/2000 |
| WO | WO 00/71605 A1 | 11/2000 |
| WO | 01/66621 | 9/2001 |
| WO | 2004/099317 | 11/2004 |
| WO | 2006/086211 | 8/2006 |
| WO | 2008/027679 | 3/2008 |

OTHER PUBLICATIONS

Sanui et al., "The Catalytic Effect of Alcohol and Mercaptan on the Michael Reaction of Acrylates", Bulletin of the Chemical Society of Japan, vol. 40, 1727 (1967).

* cited by examiner

*Primary Examiner* — Robert S Walters, Jr.
(74) *Attorney, Agent, or Firm* — Diane R. Meyers

(57) ABSTRACT

Disclosed are methods for applying and curing a multilayer coating on a substrate. The methods include applying to an aluminum substrate a primer composition, coalescing the composition to form a substantially continuous film over the substrate, exposing the film to radiation to cure the film, applying a second composition to the cured film, coalescing the second composition to form a substantially continuous second film, and curing the second film. The primer composition includes a polyene and a polythiol.

19 Claims, No Drawings

MULTILAYER COATINGS SUITABLE FOR AEROSPACE APPLICATIONS

GOVERNMENT CONTRACT

This invention was made with United States government support under Contract Number FA8650-05-C-5010 awarded by AFRL. The United States government has certain rights in this invention.

FIELD OF THE INVENTION

The present invention relates to multilayer coatings suitable for use in the painting of aircraft. More particularly, the invention relates to a novel primer coat and a topcoat.

BACKGROUND OF THE INVENTION

Surface coatings for aerospace applications comprise a primer coating and a top or finishing coating. Since the substrate associated with most commercial aircraft is aluminum including various aluminum alloys, the primer coat must adhere well to these substrates, contain corrosion inhibitors that perform effectively over these substrates, and the primer coating composition must be compatible with the subsequently applied topcoat. The primer compositions are for the most part either thermally cured materials or materials that cure at ambient temperatures such as those based on polyisocyanates. The former compositions require ovens for cure, which are disadvantageous with large aircraft, and the latter materials are not environmentally friendly. Therefore, it would be desirable to provide a primer coating composition suitable for use with commercial aircraft that cures at ambient temperature and is environmentally friendly.

SUMMARY OF THE INVENTION

The present invention provides a process for applying and curing a multilayer coating on a substrate comprising:
  (a) applying to an aluminum substrate a primer composition comprising:
    (i) a polyene,
    (ii) a polythiol;
  (b) coalescing the composition to form a substantially continuous film over the substrate;
  (c) exposing the film to radiation to cure the film;
  (d) applying a second composition to form a substantially continuous second film; and
  (e) curing the second film.

DETAILED DESCRIPTION OF EMBODIMENTS OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The term "polymer" is also meant to include copolymer and oligomer.

Acrylic and methacrylic are designated as (meth)acrylic. Likewise, allyl and methallyl are designated as (meth)allyl.

Aliphatic and cycloaliphatic are designated as (cyclo)aliphatic.

The term "aluminum" means aluminum and alloys of aluminum, such as aluminum alloyed with copper, zinc, manganese, silicon or magnesium.

The term "radiation" means free radical generating radiation.

Suitable polyenes for use in the present invention are numerous and can vary widely. Such polyenes can include those that are known in the art. Non-limiting examples of suitable polyenes can include those that are represented by the formula:

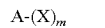

wherein A is an organic moiety, m is an integer of at least 2, and X is an olefinically unsaturated moiety and m is at least 2, typically 2 to 4. Examples of X are groups of the following structure:

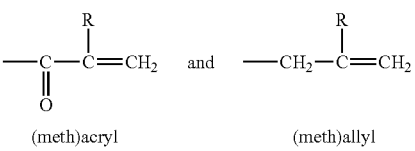

wherein each R is selected from H and an organic group, preferably methyl.

The polyenes may be compounds or polymers having in the molecule olefinic double bonds that are polymerizable by exposure to radiation. Examples of such materials are (meth)acrylic-functional (meth)acrylic copolymers, epoxy resin (meth)acrylates, polyester (meth)acrylates, polyether (meth)acrylates, polyurethane (meth)acrylates, amino (meth)acrylates, silicone (meth)acrylates, and melamine (meth)acrylates. The number average molar mass (Mn) of these compounds is preferably around 200 to 10,000. The molecule preferably contains on average 2 to 20 olefinic double bonds that are polymerizable by exposure to radiation. Polyurethane (meth)acrylates and polyester (meth)acrylates are preferred and mixtures are particularly preferred. The binders may be used singly or in mixture.

Specific examples of polyurethane (meth)acrylates are reaction products of polyisocyanates with hydroxyalkyl (meth)acrylate and optionally polyol. Examples of isocyanates are aromatic, (cyclo)aliphatic and ar(aliphatic) diisocyanates. Specific examples include diisocyanate, toluene diisocyanate, xylylene diisocyanate, 1,6-hexamethylene diisocyanate and isophorone diisocyanate. Higher functionality polyisocyanates such as triisocyanates can be used. Examples are isocyanurates of diisocyanates such as the isocyanurates of isophorone diisocyanate and 1,6-hexamethylene diisocyanate. Examples of hydroxyalkyl (meth)acrylates are hydroxyethyl (meth)acrylate and hydroxypropyl (meth)acrylate. Typically, the polyisocyanate is reacted with the hydroxyalkyl (meth)acrylate with an NCO/OH equivalent ratio >1. The resulting reaction product is then reacted with a polyol to chain extend the reaction product and consume the remaining NCO functionality. Examples of suitable polyols are diols such as 1,4-butanediol and 1,6-hexanediol. Higher functionality polyols such as triols, for example, trimethylolpropane can be used. Examples of polyester (meth)acrylates are glycerol tri(meth)acrylate, trimethylolpropane tri(meth)acrylate, pentaerythritol tri(meth)acrylate and pentaerythritol tetra(meth)acrylate. (Meth)acrylates of alkoxylated polyols such as propoxylated diol diacrylates can also be used and can be used as reactive diluents in the primer coating formulations.

Besides (meth)acrylates, (meth)allyl compounds or polymers can be used either alone or in combination with (meth)acrylates. Examples of (meth)allyl materials are polyurethanes and polyesters containing (meth)allyl groups. For example, 1,2-molar reaction products of 1,6-hexamethylene diisocyanate and/or isophorone diisocyanate with the diallylether of trimethylolpropane.

As used herein the term "polythiol functional material" or "polythiol" refers to polyfunctional materials containing two or more thiol functional groups (SH). Suitable polythiol functional materials for use in forming the radiation curable primer composition are numerous and can vary widely. Such polythiols can include those that are known in the art. Non-limiting examples of suitable polythiol functional materials can include, but are not limited to, polythiols having at least two thiol groups including compounds and polymers. The polythiol can have ether linkages (—O—), sulfide linkages (—S—), including polysulfide linkages (—$S_x$—), wherein x is at least 2, such as from 2 to 4, and combinations of such linkages.

The polythiols for use in the present invention include, but are not limited to, materials of the formula:

$$R_1—(SH)_n$$

wherein $R_1$ is a polyvalent organic moiety and n is an integer of at least 2, typically 2 to 6.

Non-limiting examples of suitable polythiols include, but are not limited to, esters of thiol-containing acids of the formula HS—$R_2$—COOH wherein $R_2$ is an organic moiety with polyhydroxy compounds of the structure $R_3$—$(OH)_n$ wherein $R_3$ is an organic moiety and n is at least 2, typically 2 to 6. These components can be reacted under suitable conditions to give polythiols having the general structure:

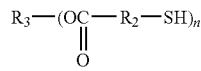

wherein $R_2$, $R_3$ and n are as defined above.

Examples of thiol-containing acids are thioglycolic acid (HS-CH$_2$COOH), α-mercaptopropionic acid (HS—CH(CH$_3$)—COOH) and β-mercaptopropionic acid (HS—CH$_2$CH$_2$COCH) with polyhydroxy compounds such as glycols, triols, tetraols, pentaols, hexaols, and mixtures thereof. Other non-limiting examples of suitable polythiols include, but are not limited to, ethylene glycol bis (thioglycolate), ethylene glycol bis(β-mercaptopropionate), trimethylolpropane tris (thioglycolate), trimethylolpropane tris (β-mercaptopropionate), pentaerythritol tetrakis (thioglycolate) and pentaerythritol tetrakis (β-mercaptopropionate), and mixtures thereof.

Typically, the polyene is present in the primer composition in amounts of 80 to 98, more typically 90 to 95 percent by weight, and the polythiol material is typically present in amounts of 2 to 20, more usually 5 to 10 percent by weight. The percentages by weight are based on total weight of polyene and polythiol.

The primer composition may contain a photoinitiator when exposed to ultraviolet radiation. Suitable photoinitiators are, for example, those that absorb within the wavelength range of 190 to 600 nm.

Examples of photoinitiators for radiation systems are benzoin and benzoin derivatives, acetophenone, and acetophenone derivatives such as, for example, 2,2-diacetoxyacetophenone, benzophenone and benzophenone derivatives, thioxanthone and thioxanthone derivatives, anthraquinone, 1-benzoylcyclohexanol, organophosphorus compounds such as, for example, acyl phosphine oxides. The photoinitiators when present are used in quantities of, for example, from 0.1 to 7 wt. %, preferably 0.5 to 5 wt. %, with reference to the weight of polyene and polythiol and photoinitiators. The photoinitiators may be used singly or in combination.

The primer compositions optionally contain customary additives that are present in such coating compositions. These include coloring pigments, corrosion inhibitors, rheology control agents, adhesion promoters and fillers. These optional ingredients are present in amounts up to 50, and preferably up to 40 percent by weight based on weight of the primer composition.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), and mixtures thereof. The terms "pigment" and "colored filler" can be used interchangeably.

Example dyes include, but are not limited to, those that are solvent based such as pthalo green or blue, iron oxide, bismuth vanadate, anthraquinone, perylene and quinacridone.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

The preferred corrosion inhibitor for use over aluminum substrates is a chromium-containing compound, preferably strontium chromate. The chromium-containing compound is typically present in the composition in amounts of at least 5, more typically 5 to 50, and preferably 10 to 40 percent by weight chromium based on solids (pigment and resin) weight of the coating composition.

The primer composition used in the content according to the invention may contain diluents such as organic solvents and/or water. However, preferably the compositions are 100 percent solids. Examples of suitable organic solvents are mono- or polyhydric alcohols, e.g., ethylene glycol and butanol, and glycol ethers or esters, e.g., diethylene glycol dialkyl ethers containing a $C_1$ to $C_6$ alkyl. When present, the diluents constitute up to 50 percent by weight of the primer composition based on weight of the composition.

The primer coating composition can be applied to the substrate by conventional techniques such as spraying, brushing, roller coating or dipping. However, spraying is preferred. The substrate to which the primer coating is applied is aluminum.

After the primer coating composition is applied to the substrate, the primer layer is cured by exposure to radiation. The radiation can be high-energy radiation or actinic radiation.

A class of high-energy bombardment includes energetic electrons such as those derived from isotopes such as strontium-90, or intense electron beams produced by particle accelerators. Electron beam curing is most useful in applications where very rapid and economical rates are desired. By way of example, in some systems curing periods of less than about one second may be experienced using a total radiation dose of less than about 0.25 megarads.

A class of actinic radiation useful herein is ultraviolet light and other forms of actinic radiation which are normally found in radiation emitted from the sun or from artificial sources such as Type RS Sunlamps, carbon arc lamps, xenon arc lamps, mercury vapor lamps, tungsten halide lamps and the like. Ultraviolet radiation may be used most efficiently if the photocurable polyene/polythiol composition contains a suitable photocuring rate accelerator. Curing periods may be adjusted to be very short and hence commercially economical by proper choice of ultraviolet source, photocuring rate accelerator and concentration thereof, temperature and molecular weight, and reactive group functionality of the polyene and polythiol. Curing periods of from 1 second to 15 minutes are typical.

Preferably, for safety reasons, low energy ultraviolet radiation falling within the 200-400 nanometer wavelength interval is preferred. Preferably, the ratio of UV-B content to UV-A content is 1:1 or less.

The thickness (dry film thickness) of the primer coating is typically from 17.8 to 38.1, preferably 20.3 to 27.9 microns.

After the primer coat has been applied to the substrate and cured, a topcoat composition is applied to the cured primer. The topcoat composition can be any of the topcoat compositions that are well known for use in aerospace applications. These materials are typically polymeric polyols such as those prepared from polymerizing ethylenically unsaturated monomers including ethylenically unsaturated monomers containing active hydrogen groups such as hydroxyl groups. These polymers are conventionally known as hydroxyl-containing acrylic polymers. Examples of other suitable polymeric polyols are polyester polyols and polyether polyols. The polymeric polyols are used in combination with polyisocyanate curing agents. Both the polymeric polyol and the polyisocyanate are preferably prepared from (cyclo)aliphatic materials. Other topcoat compositions are based on polyepoxides in combination with polyamine curing agents. Once again, all (cyclo)aliphatic systems are preferred.

The topcoat composition contains additives well known in the coatings art for aerospace topcoat applications such as coloring pigments, plasticizers, fillers, adhesion promoters and catalyst.

Examples of suitable topcoats are those commercially available from PRC-DeSoto International, Inc. under the trademark DESOTHANE; from the Sherwin-Williams Company under the trademarks JETGLO and ACRYGLO; and from Akzo Nobel Aerospace Coatings under the trademark AEROWAVE. The topcoat is applied to the primer coat by conventional techniques such as spray, brush or roller coating. Preferably, the topcoat is applied by spraying. The topcoat is typically cured at ambient temperature of from 10-40° C. The dry film thickness ranges from 1.5 to 3.0 (38 to 76), preferably from 1.7 to 2.5 (43 to 64) mils (microns) in dry film thickness.

EXAMPLES

The following examples are intended to illustrate the invention, and should not be construed as limiting the invention in any way. All parts and percentages are by weight unless otherwise indicated.

The following examples show the preparation of various primer formulations and application to aluminum substrates. The primers were based on polyenes and polythiols in varying amounts and contained strontium chromate and various other pigments in various amounts. The coatings were cured by exposure to UV radiation and the cured coatings evaluated for adhesion, corrosion resistance, flexibility, hardness and gloss as reported in the examples below. One of the cured primers was topcoated with an aerospace topcoat available from PPG Industries.

Polyene

Example A

A urethane acrylic was prepared by adding 1730.7 g of a polyisocyanate (Desmodur Z 4470 BA; Bayer Material Science), 1.52 g dibutyltindilaurate, 3.21 g IONOL, and 7.1 g triphenylphosphite to a round bottom flask, then heating to 69° C., under nitrogen. Once the temperature is reached, 393.1 g of propoxylated neopentyl glycol diacrylate (SR-9003, Sartomer) and 391.1 g of 2-hydroxyethylacrylate were added slowly over a period of 45 minutes, while keeping the temperature below 75° C. Once complete, the reaction is heated at 80° C. for 1 hour. Next, 99 g of 1,6-hexanediol was added (at 80° C.), and the reaction was held at the same temperature until all the isocyanate had reacted. Finally, 339.5 g of SR-9003, and 340.1 g of tert-butyl acetate were added, and the reaction was allowed to cool.

Polythiols

Example B

Trimethylolpropane tris(3-mercaptopropionate)

Example C

Pentaerythritol tetrakis(3-mercaptopropionate)

Example 1

UV Curable Coatings with Strontium Chromate Pigment

A 10 wt.% pigment formula was prepared by mixing 40.82 g of the urethane acrylate resin of Example A, 2.87 g of an acrylate-functional diluent (SR 9003; Sartomer), 0.24 g of a wetting and dispersing agent (Disperbyk-110; Byk Chemie), 4.11 g of strontium chromate (Strontium Chromate 177; Wayne Pigment Corporation) and 3.70 g of tert-butyl acetate. The mixture was mechanically shaken for 2-3 hours with 100 g of zircoa beads, then filtered through a cone filter to give a pigmented paste. To the paste was added: 4.44 g of an acrylate-functional adhesion promoter (CD 9050; Sartomer), 29.8 g of a 10 wt. % solution of photoinitiator (Irgacure 819; Ciba Specialty Chemicals) in acetone, and 2.82 g of the trifunctional thiol of Example B.

The aforementioned formula was sprayed, using an HVLP gun, onto bare Aluminum 2024 T3 panels and Alodine 1200 pretreated Al 2024 T3 panels. Bare Al panels were prepared by wet sanding with 400 grit paper, washing with water, followed by wiping with acetone. The sprayed formula was allowed to flash for 5 minutes, followed by a 5-minute cure with an H&S Autoshot 400 UV-A lamp at 10 inches (25.4 cm) from the substrate. The formula was sprayed to give a cured film with 1-1.5 mil (25.4-38.1 micron) dry film thickness (DFT). The coating demonstrated a tack-free surface after the 5 minutes of UV-A exposure. This formula was based on a 0.2:1 thiol:ene ratio.

Formulas that contained 20, 30 and 40 wt. % pigment were made in a similar manner.

Physical tests were performed less than 1 hour after the coatings were cured. The coatings had excellent adhesion to bare aluminum, and moderate to excellent adhesion to Alodine 1200 pretreated aluminum. Adhesion was determined by a crosshatch of 10×10 squares (a modification of ASTM D3359).

Example 2

UV Curable Coatings with Strontium Chromate, Titanium Dioxide and Black Iron Oxide Pigments A 35 wt. % pigment formula was prepared by mixing 44.58 g of the urethane acrylate resin of Example A, 3.14 g of an acrylate-functional diluent (SR 9003; Sartomer), 1.27 g of a wetting and dispersing agent (Disperbyk-110; Byk Chemie), 18.65 g of strontium chromate (Strontium Chromate 177; Wayne Pigment Corporation), 3.26 g of titanium dioxide, 0.16 g of black iron oxide and 9.23 g of tert-butyl acetate. The mixture was mechanically shaken for 2-3 hours with 100 g of zircoa beads, then filtered through a cone filter to give a pigmented paste. To the paste was added: 4.92 g of an acrylate-functional adhesion promoter (CD 9050; Sartomer), 32.54 g of a 10 wt. % solution of photoinitiator (Irgacure 819; Ciba Specialty Chemicals) in acetone, and 3.09 g of the trifunctional thiol of Example B. This formula was based on a 0.2:1 thiol:ene ratio.

The aforementioned formula was sprayed, using an HVLP gun, onto bare Aluminum 2024 T3 panels and Alodine 1200 pretreated Al 2024 T3 panels. Bare Al panels were prepared by wet sanding with 400 grit paper, washing with water, followed by wiping with acetone. The sprayed formula was allowed to flash for 5 minutes, followed by a 5-minute cure with an H&S Autoshot 400 UV-A lamp at 10 inches (25.4 cm) from the substrate. The formula was sprayed to give a cured film with 1.2-1.4 mil (30.5-35.6 micron) dry film thickness (DFT). The coating demonstrated a tack-free surface after the 5 minutes of UV-A exposure.

Formulas that contained 30, 40 and 45 wt. % pigment were made in a similar manner, though the latter two were not sprayable due to pigment gelation.

Physical tests were performed less than 1 hour after the coatings were cured. Sprayable coatings (30 and 35 wt. %) had excellent adhesion to bare aluminum.

The 30 and 35 wt. % coatings were scribed and subjected to salt spray corrosion tests for 500 hours in accordance with ASTM D 117. After this period, a small amount of corrosion was observed in the scribe of the 30 PWC (pigment weight concentration) sample, while the 35 PWC sample showed zero corrosion or blisters.

Example 3

UV Curable Coatings with Strontium Chromate, Titanium Dioxide, Carbon Black and Crystalline Silica Pigments A 49.9 wt. % pigment formula was prepared by mixing 39.19 g of the urethane acrylate resin of Example A, 2.76 g of an acrylate-functional diluent (SR 9003; Sartomer), 2.77 g of a wetting and dispersing agent (Disperbyk-110; Byk Chemie), 16.92 g of strontium chromate (Strontium Chromate 177; Wayne Pigment Corporation), 2.96 g of titanium dioxide, 0.04 g of carbon black, 16.92 g of crystalline silica (MIN-U-SIL 5; U.S. Silica) and 9.62 g of tert-butyl acetate. The mixture was mechanically shaken for 2-3 hours with 100 g of zircoa beads, then filtered through a cone filter to give a pigmented paste. To the paste was added: 4.41 g of an acrylate-functional adhesion promoter (CD 9050; Sartomer), 28.61 g of a 10 wt. % solution of photoinitiator (Irgacure 819; Ciba Specialty Chemicals) in acetone, and 2.71 g of the trifunctional thiol of Example B. This formula contained a 0.2:1 thiol:ene ratio.

The aforementioned formula was sprayed, using an HVLP gun, onto bare Aluminum 2024 T3 panels. Bare Al panels were prepared by wet sanding with 400 grit paper, washing with water, followed by wiping with acetone. The sprayed formula was allowed to flash for 5 minutes, followed by a 5-minute cure with an H&S Autoshot 400 UV-A lamp at 10 inches (25.4 cm) from the substrate. The formula was sprayed to give a cured film with 1.3-1.8 mil (33-45.7 microns) dry film thickness (DFT). The coating demonstrated a tack-free surface after the 5 minutes of UV-A exposure.

Formulas that contained 38.07, 40.86, 43.41, 45.72, and 47.91 wt. % pigment were prepared in a similar manner.

Physical tests were performed less than 24 hours after the coatings were cured. All coatings showed excellent adhesion to bare aluminum, in addition to showing zero cracking when subjected to a Conical Mandrel bend (ASTM D522). The coatings were then rated for flexibility by a visual inspection of the coating for cracking on a scale of 0 to 10. A zero rating indicates no cracking. Ten indicates extensive cracking.

Example 4

A UV Curable Coating with Strontium Chromate, Titanium Dioxide and Carbon Black Pigments, but with a Lower Level of Thiol A 35.75 wt. % pigment formula was prepared by mixing 42.45 g of the urethane acrylate resin of Example A, 2.99 g of an acrylate-functional diluent (SR 9003; Sartomer), 1.63 g of a wetting and dispersing agent (Disperbyk-110; Byk Chemie), 17.96 g of strontium chromate (Strontium Chromate 177; Wayne Pigment Corporation), 3.14 g of titanium dioxide, 0.04 g of carbon black and 8.55 g of tert-butyl acetate. The mixture was mechanically shaken for 2-3 hours with 100 g of zircoa beads, then filtered through a cone filter to give a pigmented paste. To the paste was added: 4.58 g of an acrylate-functional adhesion promoter (CD 9050; Sartomer), 30.44 g of a 10 wt. % solution of photoinitiator (Irgacure 819; Ciba Specialty Chemicals) in acetone, and 1.84 g of the trifunctional thiol of Example B. This formula contained a 0.12:1 thiol:ene ratio.

The aforementioned formula was sprayed, using an HVLP gun, onto bare Aluminum 2024 T3 panels. Bare Al panels were prepared by wet sanding with 400 grit paper, washing with water, followed by wiping with acetone. The sprayed formula was allowed to flash for 5 minutes, followed by a 5-minute cure with an H&S Autoshot 400 UV-A lamp at 10 inches (25.4 cm) from the substrate. The formula was sprayed to give a cured film with 0.9-1.3 mil (22.9-33 microns) dry film thickness (DFT). The coating demonstrated a tack-free surface after the 5 minutes of UV-A exposure.

Physical tests were performed less than 24 hours after the coating was cured. The coating had excellent adhesion to bare aluminum, in addition to showing zero cracking when subjected to a Conical Mandrel bend.

Example 5

UV Curable Coatings with Strontium Chromate, Titanium Dioxide, Carbon Black and Amorphous Silica Pigments A 45.72 wt. % pigment formula was prepared by mixing 34.11 g of the urethane acrylate resin of Example A, 2.40 g of an acrylate-functional diluent (SR 9003; Sartomer), 2.07 g of a wetting and dispersing agent (Disperbyk-110; Byk Chemie), 14.64 g of strontium chromate (Strontium Chromate 177; Wayne Pigment Corporation), 2.56 g of titanium dioxide, 0.03 g of carbon black, 9.72 g amorphous silica (Gasil IJ35; INEOS Silicas) and 16.0 g of tert-butyl acetate. The mixture was mechanically shaken for 2-3 hours with 100 g of zircoa beads, then filtered through a cone filter to give a pigmented paste. To the paste was added: 3.82 g of an acrylate-functional adhesion promoter (CD 9050; Sartomer), 24.9 g of a 10 wt. % solution of photoinitiator (Irgacure 819; Ciba Specialty Chemicals) in acetone, 2.36 g of the trifunctional thiol of Example B, and 2.50 g of acetone. This formula contained a ~0.2:1 thiol:ene ratio.

The aforementioned formula was sprayed, using an HVLP gun, onto bare Aluminum 2024 T3 panels. Bare Al panels were prepared by wet sanding with 400 grit paper, washing with water, followed by wiping with acetone. The sprayed formula was allowed to flash for 5 minutes, followed by a 5-minute cure with an H&S Autoshot 400 UV-A lamp at 10 inches 25.4 cm) from the substrate. The formula was sprayed to give a cured film with 1-1.3 mil (25.4-33 micron) dry film thickness (DFT). The coating demonstrated a tack-free surface after the 5 minutes of UV-A exposure.

Formulas that contained 40.89, 41.45, 43.41, 47.92, and 49.91 wt. % pigment were prepared in a similar manner.

Physical tests were performed less than 24 hours after the coatings were cured. All coatings, except for the 49.91 PWC sample, had excellent adhesion to bare aluminum, were extremely flexible (zero to minor cracking during a Conical Mandrel bend), and were highly solvent resistant (greater than 100 MEK double rubs), i.e., cloth dipped in methyl ethyl ketone with back and forth finger rubs. Coatings with lower levels of amorphous silica gave harder films, i.e., 145 to 169 pendulum (Konig) hardness, according to ASTM D4366, while samples with higher levels provided lower 60 degree gloss numbers using a Gardner Laboratory, Inc. Model GC-9095 gloss meter.

Example 6

UV Curable Coatings with Strontium Chromate, Titanium Dioxide, Carbon Black and Amorphous Silica Pigments. Coatings were Topcoated with a Commercial Aerospace Polyurethane Coating A 44.41 wt. % pigment formula was prepared by mixing 33.58 g of the urethane acrylate resin of Example A, 2.36 g of an acrylate-functional diluent (SR 9003; Sartomer), 1.85 g of a wetting and dispersing agent (Disperbyk-110; Byk Chemie), 14.36 g of strontium chromate (Strontium Chromate 177; Wayne Pigment Corporation), 2.69 g of titanium dioxide, 0.03 g of carbon black, 8.36 g amorphous silica (Gasil IJ35; INEOS Silicas) and 12.0 g of tert-butyl acetate. The mixture was mechanically shaken for 2-3 hours with 100 g of zircoa beads, then filtered through a cone filter to give a pigmented paste. To the paste was added: 3.58 g of an acrylate-functional adhesion promoter (CD 9050; Sartomer), 12.24 g of a 10 wt. % solution of photoinitiator (Irgacure 819; Ciba Specialty Chemicals) in acetone, and 2.33 g of the trifunctional thiol of Example B. This formula contained a ~0.19:1 thiol:ene ratio.

The aforementioned formula was sprayed, using an HVLP gun, onto bare Aluminum 2024 T3 panels. Bare Al panels were prepared by wet sanding with 400 grit paper, washing with water, followed by wiping with acetone. The sprayed formula was allowed to flash for 5 minutes, followed by a 5-minute cure with an H&S Autoshot 400 UV-A lamp at 10 inches from the substrate. The formula was sprayed to give a cured film with 0.95-1.13 mil dry film thickness (DFT). The coating demonstrated a tack-free surface after the 5 minutes of UV-A exposure.

Formulas that contained 43.07 and 45.37 wt. % pigment were prepared in a similar manner.

Physical tests were performed less than 24 hours after the coatings were cured. All coatings had excellent adhesion to bare aluminum, were extremely flexible (minor cracking during a Conical Mandrel bend), produced hard films (4H-5H pencil hardnesses), and also provided excellent adhesion with zero blisters after a 24-hour immersion in deionized water at room temperature.

Separate panels of the cured coatings were topcoated with PRC-Desoto (PPG Aerospace) CA 8214/F36173 (flat gray) 2K polyurethane topcoat, and allowed to cure for 3 days at ambient conditions (~77 F and ~50% R.H.). The dry film thickness (DFT) of the topcoat ranged from 2-2.5 mil (50.8-63.5 micron).

Topcoated samples showed excellent inter-coat adhesion (between primer and topcoat), while also showing good to excellent adhesion to the aluminum substrate. When subjected to a Conical Mandrel bend, the coatings showed zero cracking or delamination. These samples were also highly solvent resistant (over 100 MEK double rubs).

Example 7

UV Curable Coatings with Strontium Chromate, Titanium Dioxide, Carbon Black and Amorphous Silica Pigments. Each Sample Contained a Different Thiol Functional Monomer. A Sample that Lacked a Thiol Monomer was Made for Comparison A 44.18 wt. % pigment formula was prepared by mixing 33.26 g of the urethane acrylate resin of Example A, 2.72 g of an acrylate-functional diluent (SR 9003; Sartomer), 2.82 g of a wetting and dispersing agent (Disperbyk-110; Byk Chemie), 16.53 g of strontium chromate (Strontium Chromate 177; Wayne Pigment Corporation), 3.09 g of titanium dioxide, 0.04 g of carbon black, 9.62 g of amorphous silica (Gasil IJ35; INEOS Silicas), and 15.54 g of tert-butyl acetate. The mixture was mechanically shaken for 2-3 hours with 100 g of zircoa beads, followed by the addition of 12.69 g acetone, then filtration through a cone filter to give a pigmented paste. To the paste was added: 1.41 g of a photoinitiator (Irgacure 819; Ciba Specialty Chemicals), 4.12 g of an acrylate-functional adhesion promoter (CD 9050; Sartomer), and 2.68 g of the trifunctional thiol of Example B. This formula contained a 0.18:1 thiol:ene ratio.

The aforementioned formula was sprayed, using an HVLP gun, onto bare Aluminum 2024 T3 panels. Bare Al panels were prepared by wet sanding with 400 grit paper, washing with water, followed by wiping with acetone. The sprayed formula was allowed to flash for 5 minutes, followed by a 5-minute cure with an H&S Autoshot 400 UV-A lamp at 10 inches (25.4 cm) from the substrate. The formula was sprayed to give a cured film with a 0.8-1.1 mil (20.3-27.9 micron) dry film thickness (DFT). The coating demonstrated a tack-free surface after the 5 minutes of UV-A exposure.

Formulas that contained either the four-functional thiol monomer of Example C or no thiol monomer were prepared in a similar manner. Those samples with thiol all contained a 0.18:1 thiol:ene ratio.

Physical tests were performed less than 1 hour after the coatings were cured. Coatings with the three or four-functional thiol monomer had excellent adhesion to bare aluminum, whereas the sample that did not contain thiol had only moderate adhesion. The three and four-functional thiol coatings were extremely flexible (zero cracking during a Conical Mandrel bend), produced hard films (4H pencil and 110 Konig hardnesses), and also demonstrated good chemical resistance (100+ MEK double rubs). The sample that lacked thiol produced a softer film that was significantly less chemical resistant.

We claim:

1. A process for applying and curing a multilayer coating on a substrate comprising:
    (a) applying to an aluminum substrate a primer composition comprising:
        (i) a polyene having the structural formula A-$(X)_m$ where A is an organic moiety having urethane groups; X is an olefinically unsaturated moiety and m is at least 2,
        (ii) a polythiol, and
        (iii) a corrosion inhibitor which inhibits corrosion of the aluminum substrate;
    (b) coalescing the composition to form a substantially continuous film over the substrate;
    (c) exposing the film to radiation to cure the film;
    (d) applying a second composition to the cured film of step (c);
    (e) coalescing the second composition to form a substantially continuous second film; and
    (f) curing the second film.

2. The process of claim 1 in which the composition of step (a) is applied directly to the aluminum substrate.

3. The process of claim 1 in which the composition of step (a) is applied to an aluminum substrate that has been pretreated with a corrosion-inhibiting composition.

4. The process of claim 1 in which X is selected from —C(O)CR=$CH_2$ where R is hydrogen or methyl.

5. The process of claim 1 in which A is derived from a poiyisocyanate.

6. The process of claim 1 in which A-$(X)_m$ is a polyurethane (meth)acrylate.

7. The process of claim 1 in which A-$(X)_m$ is a mixture of a polyurethane (meth)acrylate and a polyester (meth)acrylate.

8. The process of claim 1 in which m is from 2 to 4.

9. The process of claim 1 in which the polythiol has the structural formula R—$(SH)_n$ where R is an organic moiety and n is at least 2.

10. The process of claim 9 in which R contains ester groups.

11. The process of claim 9 in which R is derived from a polyol.

12. The process of claim 9 in which the polythiol is the reaction product of a thiol-functional organic acid and a polyol.

13. The process of claim 9 in which n is from 2 to 4.

14. The process of claim 1 in which the polyene is present in the primer composition in amounts of 80 to 98 percent by weight and the polythiol is present in amounts of 2 to 20 percent by weight; the percentages by weight being based on weight of polyene and polythiol.

15. The process of claim 1 in which the polyene is present in the primer composition in amounts of 90 to 95 percent by weight and the polythiol is present in amounts of 5 to 10 percent by weight; the percentages by weight being based on weight of polyene and polythiol.

16. The process of claim 1 in which the composition applied in step (a) contains at least 5 percent by weight of the corrosion inhibitor based on solids weight of the composition.

17. The process of claim 16 in which the corrosion inhibitor is strontium chromate.

18. The process of claim 1 in which the film formed in step (c) is exposed to ultraviolet radiation falling within the 200-400 nanometer wavelength interval.

19. The process of claim 16 in which the ratio of UV-B content to UV-A content of the radiation is 1:1 or less.

* * * * *